United States Patent
Akutsu et al.

(10) Patent No.: US 10,507,948 B2
(45) Date of Patent: Dec. 17, 2019

(54) HOLLOW MOLDED ARTICLE HAVING EXCELLENT AQUEOUS LIQUID SLIPPERINESS

(71) Applicant: TOYO SEIKAN GROUP HOLDINGS, LTD., Tokyo (JP)

(72) Inventors: Yosuke Akutsu, Yokohama (JP); Shinya Iwamoto, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 153 days.

(21) Appl. No.: 15/523,985

(22) PCT Filed: Nov. 13, 2015

(86) PCT No.: PCT/JP2015/081935
§ 371 (c)(1),
(2) Date: May 3, 2017

(87) PCT Pub. No.: WO2016/076410
PCT Pub. Date: May 19, 2016

(65) Prior Publication Data
US 2018/0305065 A1    Oct. 25, 2018

(30) Foreign Application Priority Data
Nov. 13, 2014    (JP) .................... 2014-230642

(51) Int. Cl.
| | |
|---|---|
| *B65D 1/08* | (2006.01) |
| *B65D 1/02* | (2006.01) |
| *B65D 85/72* | (2006.01) |
| *C08J 7/04* | (2006.01) |

(52) U.S. Cl.
CPC ............. *B65D 1/08* (2013.01); *B65D 1/02* (2013.01); *B65D 85/72* (2013.01); *C08J 7/04* (2013.01)

(58) Field of Classification Search
CPC .......... B65D 1/08; B65D 1/02; B65D 1/0215; B65D 85/72; C09J 7/04; C09J 7/065; C09L 23/06; B32B 27/08; B32B 15/08
USPC .......... 428/34.1, 34.6, 34.7, 36.9; 220/62.11, 220/62.22; 524/232
See application file for complete search history.

(56) References Cited

U.S. PATENT DOCUMENTS

| | | |
|---|---|---|
| 2010/0092621 A1 | 4/2010 | Akutsu et al. |
| 2013/0032316 A1 | 2/2013 | Dhiman et al. |
| 2013/0251769 A1 | 9/2013 | Smith et al. |
| 2014/0309348 A1 | 10/2014 | Akutsu et al. |

(Continued)

FOREIGN PATENT DOCUMENTS

| | | | |
|---|---|---|---|
| JP | H06-099481 A | * | 12/1994 |
| JP | 2007-284066 A | | 11/2007 |

(Continued)

OTHER PUBLICATIONS

International Search Report for PCT/JP2015/081935 dated Feb. 2, 2016.

*Primary Examiner* — Ruiyun Zhang
(74) *Attorney, Agent, or Firm* — Sughrue Mion, PLLC

(57) ABSTRACT

A hollow molded container of the present invention has a resin layer forming its inner surface, and droplets of an oily liquid are distributed on the surface of the resin layer. In the hollow molded container, slipperiness to a less flowable liquid is enhanced remarkably and the slipperiness is exhibited for a long period of time.

14 Claims, 3 Drawing Sheets

(56) References Cited

U.S. PATENT DOCUMENTS

2015/0108032 A1  4/2015 Akutsu et al.
2015/0353271 A1  12/2015 Akutsu et al.

FOREIGN PATENT DOCUMENTS

| JP | 2008-222291 A | 9/2008 |
| JP | 2009-214914 A | 9/2009 |
| JP | 2011-255901 A | 12/2011 |
| WO | 2013/022467 A2 | 2/2013 |
| WO | 2013/065735 A1 | 5/2013 |
| WO | 2014/010534 A1 | 1/2014 |
| WO | 2014/123217 A1 | 8/2014 |

* cited by examiner

HOLLOW MOLDED ARTICLE HAVING EXCELLENT AQUEOUS LIQUID SLIPPERINESS

CROSS REFERENCE TO RELATED APPLICATIONS

This application is a National Stage of International Application No. PCT/JP2015/081935 filed Nov. 13, 2015, claiming priority based on Japanese Patent Application No. 2014-230642 filed Nov. 13, 2014, the contents of all of which are incorporated herein by reference in their entirety.

TECHNICAL FIELD

The present invention relates to a hollow molded article having excellent slipperiness to an aqueous liquid, in particular, to an aqueous liquid having high viscosity.

BACKGROUND ART

Plastic containers are widely used in a variety of applications since they can be molded easily and can be manufactured at a low cost. In particular, a bottle-shape olefin resin container that has an inner wall surface formed of an olefin resin such as a low-density polyethylene and that is formed by direct blow molding is used preferably as a container for containing a viscous, slurry-like or paste-like and less flowable liquid such as a ketchup from a standpoint that the contents can be easily squeezed out.

Usually, a bottle containing a viscous and less flowable liquid is stored in an inverted state to discharge quickly the liquid (contents) or to use up the liquid without remaining in the bottle. It is therefore desired that the viscous liquid quickly falls down without adhering to and remaining on the inner wall surface of the bottle when the bottle is inverted.

The property is desired similarly for a hollow molded article such as a hollow pipe. Usually, the hollow pipe is used to convey a viscous and less flowable liquid, and thus, it is required to make the less flowable liquid flow at a low pressure without making the liquid adhere to and remain inside the hollow pipe.

As a bottle to satisfy the aforementioned requirements, for example, Patent Document 1 proposes a multilayer structure bottle having an innermost layer formed of an olefin resin having a melt flow rate (MFR) of not less than 10 g/10 min.

The innermost layer of this multilayer structure bottle has an excellent wettability to oily contents. Therefore, when the bottle is inverted or tilted, the oily contents such as mayonnaise fall down while spreading along the surface of the innermost layer and can be discharged completely without adhering to and remaining on the inner wall surface (innermost layer surface) of the bottle.

As for the bottle for containing a viscous liquid like ketchup containing plant fibers dispersed in water, Patent Document 2 and Patent Document 3 each propose a bottle of a polyolefin resin having an innermost layer in which saturated or unsaturated aliphatic amide as a lubricant is blended.

The aforementioned Patent Documents 1-3 refer to a plastic container whose slipperiness to contents is improved by the chemical composition of the thermoplastic resin forming the inner surface of the container. Although a certain degree of improvement in the slipperiness has been achieved, the improvement in the slipperiness is limited due to the limitation of the type of the thermoplastic resin in use and the limitation of the additive, whereby any remarkable improvement has not been achieved yet.

There has been also proposed formation of a liquid layer on a surface to be in contact with a liquid. For example, a container proposed in Patent Document 4 has an inner surface, namely, a surface to be in contact with contents, which is a liquid-permeable surface, and a liquid immiscible with the contents is held on the liquid-permeable surface. Patent Document 5 proposes formation of an inner surface of a container with a resin composition including a molding resin and a liquid (a liquid immiscible with the contents).

In Patent Documents 4 and 5, a continuous liquid layer is formed on the container inner surface to be in contact with the contents, thereby improving remarkably the slipperiness to less flowable liquids, such as ketchup, sauce and mayonnaise.

Remarkable improvement in slipperiness can be achieved by the method of forming a continuous liquid layer on the inner surface of the hollow molded article such as a container to be in contact with a less flowable liquid. However, the liquid layer may drop out due to the gravity. For example, when the liquid layer is formed on the inner surface of a container like a bottle and then the bottle is held in an erected state, the liquid layer on the inner surface of the body portion falls little by little on the bottom of the container over time, and at the end, substantially no liquid layer is present on the inner surface of the body portion. By the time this container is filled with a less flowable liquid, the slipperiness of the inner surface of the body portion to the liquid may be degraded.

PRIOR ART DOCUMENTS

Patent Documents

Patent Document 1: JP-A-2007-284066
Patent Document 2: JP-A-2008-222291
Patent Document 3: JP-A-2009-214914
Patent Document 4: WO2014/010534
Patent Document 5: WO2014/123217

SUMMARY OF THE INVENTION

Problems to be Solved by the Invention

Therefore, an object of the present invention is to provide a hollow molded article that has a remarkably improved slipperiness to a less flowable liquid and that exhibits the slipperiness for a long period of time.

Means for Solving the Problems

The inventors have found that, by distributing droplets of an oily liquid on a surface to be brought into contact with an aqueous liquid, the surface is ensured to have a remarkable slipperiness comparable to that of a surface on which a continuous liquid layer is formed, and the slipperiness is maintained stably for a long period of time, whereby the present invention is achieved.

According to the present invention, there is provided a hollow molded article having a resin layer forming an inner surface, wherein the droplets of the oily liquid are distributed on a surface of the resin layer.

In the hollow molded article of the present invention, it is preferable that:
(1) the droplets have an equivalent circle diameter in a range of 25 to 500 μm;

(2) the droplets are distributed in a density of 100 to 1000 number/cm$^2$;
(3) the oily liquid is blended in the resin layer;
(4) the surface of the resin layer forming the inner surface of the hollow molded article forms a hybridized surface comprising a matrix resin and a substance having a lower critical surface tension as compared with the matrix resin;
(5) the surface of the resin layer is formed of the matrix resin and a dispersed resin having a lower critical surface tension as compared with the matrix resin;
(6) the matrix resin is an ethylene resin, and the dispersed resin is a propylene resin;
(7) the surface of the resin layer is formed of the matrix resin and a bleedable organic additive having a lower critical surface tension as compared with the matrix resin;
(8) the matrix resin is an ethylene resin, and the bleedable organic additive is a fatty acid metal salt;
(9) the hollow molded article is a direct blow-molded bottle having a closed mouth portion; and
(10) the hollow molded article is a long-length pile.

The hollow molded article of the present invention is used by bringing the aqueous liquid into contact with the surface of the resin layer forming the inner surface, in a state where the droplets are distributed on the surface of the resin layer forming the inner surface.

Effects of the Invention

In the hollow molded article of the present invention in use, the inner surface is brought into contact with an aqueous liquid. In a stage prior to the contact of the aqueous liquid with the inner surface (for example, a container before being filled with the aqueous liquid as the contents), an oily liquid is distributed as lightweight droplets on the inner surface. This serves to effectively prevent the liquid from falling due to the gravity, and the oily liquid is held stably on the inner surface for a long period of time.

In Examples described later, droplets of an oily liquid are distributed on the inner surface of a direct blow-molded bottle (hollow molded article). Even after holding the thus molded bottle in an erected state for about 50 days, there is no puddle of the oily liquid on the bottom of the bottle. In contrast, as for the bottle of Comparative Example 1 in which the oily liquid is provided as a continuous layer, after holding the bottle in an erected state for about 10 days, a puddle of the oily liquid is observed on the bottom of the bottle.

In the present invention, the oily liquid is not a continuous layer but it is distributed as droplets. Nevertheless, a remarkable slipperiness to a less flowable liquid (for example, ketchup) is exhibited, similar to the case where the oily liquid is provided as a continuous layer. The reason has not been clarified yet, but it is assumed as follows. That is, when the less flowable liquid is provided on the surface where the droplets of the oily liquid are distributed, the droplets are compressed and spread, thereby forming a layer of the oily liquid on the entire inner surface of the hollow molded article.

MODE FOR CARRYING OUT THE INVENTION

<State of Inner Surface of Hollow Molded Article>

Figure 1:
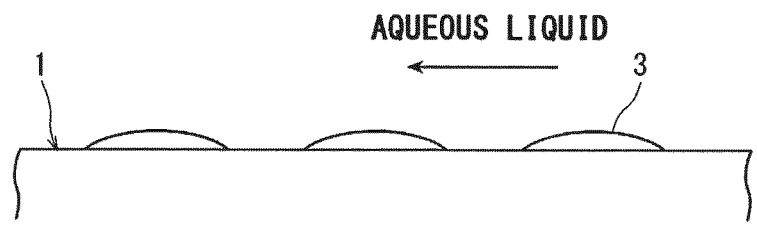
FIG. 1 is a view showing a state of an inner surface of a hollow molded article of the present invention.

FIG. 1 shows the state of the inner surface of the hollow molded article of the present invention. In FIG. 1, the hollow molded article has a plastic inner surface 1 (i.e., the inner surface 1 is formed of a resin layer), and droplets 3 of an oily liquid are distributed on the inner surface 1. The thus distributed droplets 3 allow the inner surface 1 to exhibit a remarkable slipperiness to a viscous and less flowable liquid, and thus, the liquid is allowed to pass quickly without adhering to the inner surface 1. In other words, as mentioned above, when the less flowable aqueous liquid passes on the inner surface 1, probably the droplets 3 are compressed and spread, and thus, the aqueous liquid passes on the inner surface 1, keeping in contact with an oily liquid layer formed by the spread droplets 3 of the oily liquid. As a result, the slipperiness to the aqueous liquid is improved remarkably.

In the present invention, it is preferable that the droplets 3 distributed on the inner surface 1 have an equivalent circle size (diameter) of 25 to 500 μm, in particular, 50 to 400 μm. When the droplets 3 are too large, the droplets are susceptible to the gravity due to the increased weight, and the droplets 3 would fall down easily in the state where the inner surface 1 is kept in an erected state. As a result, the slipperiness by the oily liquid forming the droplets 3 may be degraded easily over time, and the advantage of the present invention may not be exhibited sufficiently. When the droplets 3 are too small, the droplets may be prevented from falling or the like, but the slipperiness to the aqueous liquid tends to be degraded, probably because the droplets 3 cannot spread easily while the aqueous liquid passes on the inner surface 1.

Therefore, it is preferable in the present invention that the equivalent circle size (equivalent circle diameter) of the droplets 3 is adjusted within the aforementioned range.

Further, it is preferable that the droplets 3 are distributed in the density of 100 to 1000 number/cm$^2$, in particular 200 to 600 number/cm$^2$, in order to exhibit the maximal slipperiness by the oily liquid at the time the aqueous liquid passes on the inner surface 1 and also to effectively avoid fall and dropout of the droplets 3. When the distribution density of the droplets 3 is too large, the droplets 3 are easily combined with each other and thus, the droplets 3 may easily fall and drop out. When the distribution density of the droplets 3 is too small, evidently the slipperiness by the oily liquid cannot be exhibited sufficiently.

As mentioned above, for achieving the object of the present invention, it is advantageous to distribute the droplets 3 of the oily liquid of an appropriate size in an appropriate density on the inner surface 1. The size and the distribution density of the droplets 3 can be adjusted by blending the oily liquid for forming the droplets 3 in the resin to form the inner surface 1 and then by forming the droplets 3 through bleeding from the resin layer that forms the inner surface 1. In other words, the aforementioned droplets 3 cannot be formed by an external application such as spraying, because the distribution density of the droplets 3 is excessively increased, whereby the droplets 3 are combined with each other and grow excessively.

Methods for forming the inner surface 1 with the droplets 3 satisfying the requirements for the size and the distribution density will be described later.

<Aqueous Liquid>

In the present invention, the aqueous liquid to pass on the inner surface 1 is water or a hydrophilic substance containing water. Any aqueous liquid may be used in accordance with the use of the hollow molded article, and usually a viscous liquid having a viscosity of 100 mPa·s or more (25° C.) is used preferably. In the present invention, the maximal slipperiness can be exhibited when a particularly viscous liquid having high viscosity is made pass on the inner surface 1. The mechanism is considered as follows. That is, when a liquid having a high viscosity is made pass on the inner surface 1, the droplets 3 are compressed and spread sufficiently, thereby to form a liquid layer on the inner surface 1 so as to exhibit a sufficient slipperiness due to the oily liquid. In a case where a liquid having a low viscosity is used, the droplets 3 may not be compressed and spread sufficiently, and as a result, it may be difficult to exhibit a high slipperiness.

Specific examples of the aforementioned aqueous liquid having high viscosity include, though not limited thereto, ketchup, aqueous paste, honey, various sauces, mayonnaise, cosmetic liquids such as milky lotion, a liquid detergent, a shampoo, a rinse, a hair conditioner and the like.

<Oily Liquid>

The oily liquid to be used for forming the droplets 3 is required to be a non-volatile liquid that produces a small vapor pressure under the atmospheric pressure, that is, a liquid having a high boiling point of not lower than 200° C., for example. If a volatile liquid is used, then the liquid might easily volatize and lost over time, thereby making formation of the droplets 3 difficult.

Specific examples of the oily liquid may include various types of liquids having high boiling points as mentioned above. An oily liquid having a surface tension considerably different from that of the aqueous liquid to pass thereon provides a greater lubricating effect, and an oily liquid immiscible with the aqueous liquid is preferable in the present invention. Namely, considering that the aqueous liquid is water or a hydrophilic substance including water, it is preferable to use a liquid having a surface tension (23° C.) in a range of 10 to 40 mN/m, particularly in a range of 16 to 35 mN/m. Typical examples thereof include a fluorine-containing liquid, a fluorine-containing surfactant, a silicone oil, fatty acid triglyceride, glycerol fatty acid ester, and various vegetable oils. Examples of the vegetable oil that can be used preferably include soybean oil, rapeseed oil, olive oil, rice oil, corn oil, safflower oil, sesame oil, palm oil, castor oil, avocado oil, coconut oil, almond oil, walnut oil, hazelnut oil, and salad oil. Among them, medium chain fatty acid triglyceride is used particularly preferably.

In the present invention, a suitable oily liquid among the aforementioned examples is selected in accordance with the use of the hollow molded article and the type of the aqueous liquid to pass on the inner surface 1 for example, to be used as the oily liquid to form the droplets 3.

<Inner Surface Resin Layer Forming Inner Surface 1>

In the present invention, the inner surface resin layer forming the inner surface 1 is molded by any method in accordance with the shape of the hollow molded article by using any moldable resin such as a thermoplastic resin. Examples of the thermoplastic resin include, though not limited thereto, polyolefin resins such as low-density polyethylene, high-density polyethylene, polypropylene, poly1-butene, poly4-methyl-1-pentene, or, a random/block copolymer of α-olefins such as ethylene, propylene, 1-butene, and 4-methyl-1-pentene; ethylene-vinyl compound copolymer resins such as ethylene-vinyl acetate copolymer, ethylene-vinyl alcohol copolymer, and ethylene-vinyl chloride copolymer; styrene resins such as polystyrene, acrylonitrile-styrene copolymer, ABS, and α-methylstyrene-styrene copolymer; vinyl resins such as polyvinyl alcohol, polyvinyl pyrrolidone, polyvinyl chloride, polyvinylidene chloride, vinyl chloride-vinylidene chloride copolymer, polyacrylic acid, polymethacrylic acid, methyl polyacrylate, and polymethylmethacrylate; polyamide-based resins such as nylon 6, nylon 6-6, nylon 6-10, nylon 11, and nylon 12; polyester resins such as polyethylene terephthalate, polybutylene terephthalate and polyethylene naphthalate; polycarbonate; polyphenylene oxide; cellulose derivatives such as carboxymethyl cellulose, and hydroxyethyl cellulose; starches such as oxidized starch, etherified starch, and dextrin; and a resin of a mixture thereof.

As described above, it is required that the oily liquid to form the droplets 3 is blended in this resin layer. The droplets 3 are formed through bleeding of the oily liquid blended in the inner surface resin layer.

The blending amount of the oily liquid is usually per 100 mass parts of the aforementioned thermoplastic resin forming the inner surface 1, 2 to 15 mass parts, and particularly about 3 to 10 mass parts. The amount may be set suitably within the range depending on the type of the oily liquid and the type of the thermoplastic resin in use, as long as the moldability is not impaired.

In the present invention, among the aforementioned thermoplastic resins, a thermoplastic resin suitable for bleeding of the oily liquid and satisfying physical properties such as strength required for the hollow molded article is selected. In the present invention, specifically two types of thermoplastic resins are selected. That is, preferably, a blend of a matrix resin and a dispersed resin having a critical surface tension lower than that of the matrix resin is used for the resin for forming the inner surface 1, to which the aforementioned oily liquid is blended, thereby preparing a resin composition for forming the inner surface 1. For dispersing in the matrix resin the resin having a critical surface tension lower than that of the matrix resin, these resins are required to be immiscible with each other. If these resins were highly miscible with each other, the resin having a lower critical surface tension would be melted uniformly in the matrix resin so as to form a homogeneous layer, which might hinder the uneven distribution of the dispersed resin 5 as described below.

Figure 2:
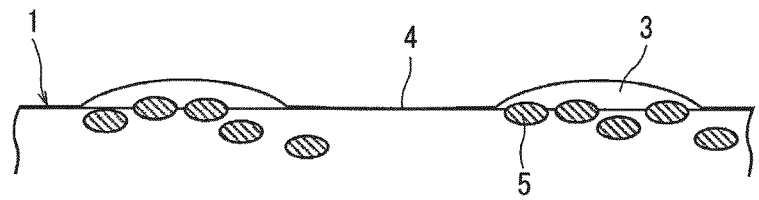
FIG. 2 is a conceptual diagram showing a cross-sectional structure of an inner surface resin layer forming the inner surface of the hollow molded article of the present invention.

When the inner surface 1 is formed by using the aforementioned resin composition, as shown in FIG. 2, the dispersed resin 5 having a low critical surface tension is distributed on the inner surface 1, and the dispersed resin 5 is present unevenly. That is, due to the uneven distribution of the dispersed resin 5, the inner surface 1 becomes a hybridized surface partially having a non-uniform surface tension. The oily liquid is bled on the hybridized surface.

However, since the surface tension varies depending on the position on the hybridized surface due to the uneven distribution of the dispersed resin having a low critical surface tension, a condition energetically instable for forming a liquid layer having a uniform thickness as a whole is provided. It is considered that this condition is stabilized energetically due to existence of the drop-like oily liquid. As a result, the oily liquid is bled to form droplets and thus, the droplets 3 are formed easily on the inner surface 1.

Further, a matrix resin having a critical surface tension higher than the surface tension of the oily liquid is selected, and a dispersed resin 5 having a critical surface tension lower than the critical surface tension of the matrix resin is selected. It is considered that, as a result of use of these resins, on the thus formed hybridized surface, the oily liquid form an extremely thin liquid film 4 at a part where the matrix resin is exposed, while the oily liquid forms droplets at a part where the dispersed resin 5 is exposed more.

Utilizing this, the size and the distribution density of the droplets 3 can be adjusted. For example, it is desirable that the resins are selected from the viewpoint of favorable bleeding property of the oily liquid and furthermore for increasing the difference in the critical surface tensions between the matrix resin and the dispersed resin. From the viewpoint of adjusting the size and the distribution density of the droplets 3, it is particularly preferable to select a dispersed resin having a critical surface tension approximate to or lower than that of the oily liquid to be used. Further, it is preferable that a matrix resin having a critical surface tension higher than the surface tension of the oily liquid is selected. Then reason is as follows. It is considered that at a time of contact with the aqueous liquid, the thin liquid film 4 of the oily liquid is formed on the matrix resin surface. Therefore, when the matrix resin has a higher critical surface tension, the droplets 3 formed on the inner surface 1 are compressed and spread to be transformed easily into a liquid layer.

From the viewpoint, it is preferable in the present invention that the matrix resin and the dispersed resin are selected from the olefin resins. It is particularly preferable that an ethylene resin such as polyethylene or a copolymer based on ethylene is selected as the matrix resin and a propylene resin such as propylene or a copolymer based on polypropylene is selected as the dispersed resin.

For unevenly distributing the dispersed resin 5 in the vicinity of the inner surface 1, it is most suitable that the matrix resin and the dispersed resin are used at the mass ratio of:

matrix resin: dispersed resin=100:3 to 100:100,
particularly, 100:5 to 100:50, and
more particularly, 100:10 to 100:30.

In an alternative method for forming the aforementioned hybridized surface, the inner surface 1 can be formed of a resin composition prepared by using the matrix resin and a bleedable organic additive having a critical surface tension lower than that of the matrix resin as the resins for forming the inner surface 1 and blending therein the aforementioned oily liquid. The bleedable organic additive is required to be insoluble or poorly soluble in the oily liquid. An example of the bleedable organic additive having the nature is a fatty acid metal salt that is solid at room temperature.

A typical example of the fatty acid metal salt is formed of a fatty acid of C4-C22 and a metal such as lithium, magnesium, calcium, potassium, and zinc. The fatty acid metal salt is insoluble or poorly soluble in the oily liquid and it can be used after appropriate adjustment such that its critical surface tension becomes lower than that of the matrix resin.

When the inner surface 1 is formed by using the resin composition, a bleedable additive having a low critical surface tension will be distributed and present unevenly on the inner surface 1, thereby forming a hybridized surface where the partial surface tension is not uniform. Since the oily liquid is bled on the hybridized surface, similarly to the case of the aforementioned dispersed resin, the oily liquid can be formed as droplets even when the matrix resin and the bleedable organic additive having a critical surface tension lower than that of the matrix resin are used.

For unevenly distributing the bleedable additive in the vicinity of the inner surface 1, it is most suitable that the matrix resin and the bleedable additive are used at the mass ratio of:

matrix resin: dispersed resin=100:0.03 to 100:2,
particularly, 100:0.05 to 100:1, and
more particularly, 100:0.01 to 100:0.5.

In this manner, the droplets 3 of the aforementioned size can be distributed in the aforementioned density effectively on the inner surface.

Assumedly, when the droplets 3 formed on the inner surface 1 get in contact with the aqueous liquid, the droplets 3 are compressed and spread to form a layer of the oily liquid partly or entirely on the hollow molded article. For holding stably the layer of the oily liquid after the contact with the aqueous liquid, as a surface property of the inner surface 1, preferably, a contact angle of oil in water is set to be not more than 40°. If the contact angle of oil in water is large (e.g., 90° or more), the layer of the oily liquid in the aqueous liquid would be destabilized and thus, the liquid layer would be peeled off to lose its capacity. For this reason, for the resin to constitute the inner surface 1, selection of a combination of a matrix resin and a dispersed resin to make the contact angle of oil in water be 40° or less is preferable. For the combination, the aforementioned ethylene resin and the propylene resin are used preferably.

In the present invention, fine particles as a roughening additive may be blended in the resin composition for forming the inner surface including the aforementioned oily liquid. That is, by blending an appropriate amount of the fine particles in advance, the inner surface 1 has a suitable roughness, which is effective in preventing fall of the droplets 3.

The fine particles to be used as the roughening additive are particles having an average particle diameter of not more than 20 μm based on volume measured by a laser diffraction/scattering method, for example. Typical examples thereof include: particles of metal oxides such as titanium oxide, alumina, and silica; carbon-containing fine particles of carbonates such as calcium carbonate, and carbon black; and organic fine particles formed of silicone particles or the like such as polymethyl(meth)acrylate, polyethylene, and polyorganosilsesquioxane. They may be hydrophobized with a silane coupling agent, silicone oil and the like. Usually, the amount of the fine particles used as the roughening additive is about 1 to about 20 mass parts per 100 mass parts of thermoplastic resin (total amount of matrix resin and dispersed resin) for inner surface formation.

<Layer Structure of Hollow Molded Article>

The hollow molded article of the present invention may have a monolayer structure formed of a resin composition blended with an oily liquid for forming the inner surface, or it may have a multilayer structure where an additional layer is laminated under the inner surface resin layer forming the inner surface 1, as long as the inner surface 1 with the aforementioned droplets 3 distributed thereon is formed.

In particular, in the present invention, the oily liquid for forming the droplets 3 is blended in the inner surface resin layer forming the inner surface 1. In light of this, it is preferable to form a multilayer structure by arranging the liquid-diffusion preventing layer under the inner surface layer, for the purpose of controlling the bleeding amount of the oily liquid onto the inner surface 1 and also forming the droplets 3 of the aforementioned size stably in the aforementioned distribution density.

The material of the liquid-diffusion preventing layer is not limited particularly as long as it is capable of preventing permeation and diffusion of a liquid and suitable for molding the hollow molded article. It may be a metal foil or a metal vapor deposition film, or formed of an inorganic material such as glass and ceramics. It may be a diamond-like-carbon (DLC) deposition film, or may be formed of an organic material such as a thermosetting resin and a thermoplastic resin. Usually it is preferably formed of an organic material, particularly a thermoplastic resin, because molding of a hollow molded article from a liquid-diffusion preventing layer formed of an inorganic material is difficult.

As the thermoplastic resin used for forming the liquid-diffusion preventing layer, a thermoplastic resin having a density of not less than 1.00 $g/cm^3$ and a glass transition point (Tg) of not lower than 35° C. or a thermoplastic resin having a crystallinity of not less than 0.5 is used. Namely, the thermoplastic resin is dense and apparently the migration and diffusion of the liquid in the resin may be limited considerably, and thus, permeation and diffusion of the oily liquid can be inhibited effectively. For example, if the resin has a density and a glass transition point (Tg) both of which are lower than the aforementioned ranges, the liquid-diffusion preventing layer would become a loose layer having inferior capability of limiting migration and diffusion of the liquid, which would make it difficult to prevent effectively permeation and diffusion of the liquid. When the crystallinity of the resin is less than 0.5, the resin would have fewer crystal components to limit the migration and diffusion of the liquid in the resin, namely, the capability of limiting would be decreased, which would make it difficult to effectively prevent permeation and diffusion of the liquid.

It is preferable that the liquid-diffusion preventing layer formed of the organic material has a thickness of not less than 2 μm for example, and particularly preferably in a range of about 5 to about 80 μm. If the layer is too thin, the capability for preventing the liquid diffusion may become unsatisfactory. If the layer is too thick, the thickness of the hollow molded article may be increased more than necessary, which does not bring any cost advantage.

In the present invention, the thermoplastic resin having the aforementioned density and the glass transition point (Tg) is not limited in particular. The examples usually preferred include: gas barrier resins such as ethylene-vinyl alcohol copolymer (saponified product of ethylene-vinyl acetate copolymer), aliphatic polyamide, aromatic polyamide and cyclic polyolefin; polyesters such as polyethylene terephthalate and liquid crystal polymer; and polycarbonate. For example, when the liquid-diffusion preventing layer is formed of such a gas barrier resin, the liquid-diffusion preventing layer can be imparted also with a gas-shielding property for preventing permeation of a gas such as oxygen. In particular, in the case of making the hollow molded article as a container, it is extremely advantageous because oxidation deterioration of contents can be prevented. Among them, the ethylene-vinyl alcohol copolymer exhibits particularly excellent oxygen barrier property, and thus, it is most preferred.

Preferred examples of the ethylene-vinyl alcohol copolymer are the saponified products of the copolymers obtained by saponifying the ethylene-vinyl acetate copolymers having an ethylene content of 20 to 60 mol % and, specifically, 25 to 50 mol % so as to have a saponification degree of not less than 96 mol % and, specifically, not less than 99 mol %. From them, an ethylene-vinyl alcohol copolymer having the density and the glass transition point (Tg) lying in the above ranges may be selected and used.

Each of the aforementioned gas barrier resins may be used alone, or a polyolefin such as polyethylene and the gas barrier resin may be blended to form a liquid-diffusion preventing layer as long as the density and the glass transition point (Tg) are within the aforementioned ranges.

When the gas barrier resin as described above is used as the liquid-diffusion preventing layer, it is preferable that an adhesive resin layer is provided adjacent to the liquid-diffusion preventing layer in order to enhance the adhesiveness with the inner surface resin layer having the aforementioned inner surface 1 and to prevent delamination. In this manner, the liquid-diffusion preventing layer can be adhered and fixed to the inner surface resin. The adhesive resin used for forming the adhesive resin layer is known per se, and for example, it is a resin containing 1 to 100 meq/100 g, particularly 10 to 100 meq/100 g of carbonyl group (>C=O) in the main chain or in the side chain. The specific examples to be used as the adhesive resin include: olefin resins graft-modified with a carboxylic acid such as maleic acid, itaconic acid and fumaric acid, and its anhydride, amide, ester or the like; an ethylene-acrylic acid copolymer; an ionically crosslinked olefin copolymer; and an ethylene-vinyl acetate copolymer. The thickness of the adhesive resin layer may be such that a suitable adhesive force can be obtained, and usually from 0.5 to 20 μm, preferably from about 1 to about 8 μm.

Usually, the adhesive resin also has the density, the glass transition point and the crystallinity of the aforementioned ranges, and therefore, it can serve as a liquid-diffusion preventing layer.

In the multilayer structure in which the aforementioned liquid-diffusion preventing layer is provided under the inner surface resin layer, another layer may be further formed on the liquid-diffusion preventing layer. For example, an outer surface layer formed by using the thermoplastic resin used for forming the aforementioned inner surface 1 may be laminated suitably via the aforementioned adhesive resin layer.

Furthermore, a reproduced layer including a scrap resin like burrs generated during formation of this hollow molded article may be formed on the outer surface side.

<Shape of Hollow Molded Article>

The hollow molded article of the present invention is formed by a molding means known per se, using the aforementioned resin composition for forming the inner surface 1. The shape of the hollow molded article may be varied. From the viewpoint of holding the droplets 3 stably for a long period of time and exhibiting excellent slipperiness to a viscous aqueous liquid for a long period of time, the hollow molded article is used extremely favorably as a container for containing the aqueous liquid or a long-length pipe for passing the aqueous liquid, and is most suitably used as a container. These examples are not for limiting the shape, but a cap, a spout, a pipe and the like can be cut into a predetermined size therefor.

Such a container is produced in the same manner as conventionally known methods except that the aforementioned resin composition is used for forming an inner surface.

For example, a preform for a container is formed by extrusion (extrusion molding) or injection (injection molding) of a molten resin (melt of a molding resin), and then a fluid to be molded by blowing is supplied into the preform maintained at a predetermined blow-molding temperature, thereby shaping a container.

The shape of the preform varies depending on the intended shape of the container. For example, a biaxially-stretch blown container has a shape of test tube, and an unstretched part (where a screw or a support ring is formed for fastening a cap) for serving as a mouth portion of the container is formed, and such a preform is usually formed by injection molding.

On the other hand, the preform for the direct blow-molded container has a pipe shape. For example, in a case of a bottle-shape container, the part to serve as a bottom portion of the container is pinched off and closed. Such a preform is molded by extrusion.

Figure 3:
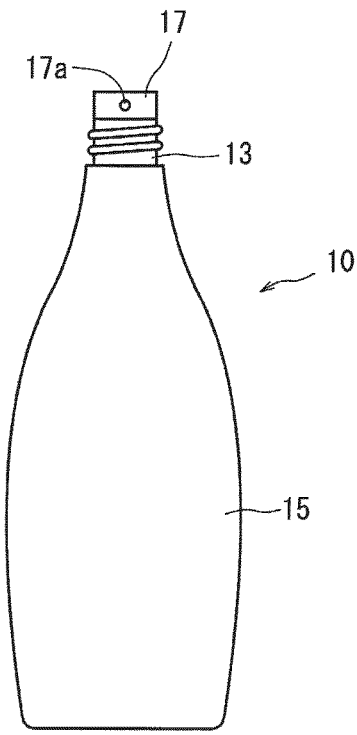
FIG. 3 is a view showing a state of an empty container (a direct blow-molded bottle), which is the most preferable form of the hollow molded article of the present invention.

FIG. 3 shows an empty container (direct blow-molded container for food) immediately after molding, which is favorably used for containing a particularly viscous aqueous liquid.

This empty container indicated with a reference numeral 10 as a whole has a mouth portion 13 provided with a screw or the like on the upper part, and has a blown part (i.e., a stretched part including a body portion and a bottom portion formed to close the body portion) continuing to the mouth portion 13. Droplets 3 of the aforementioned oily liquid are formed on the inner surface of the blown part.

On the upper part of the mouth portion 13, a closing portion 17 that closes the mouth portion 13 is formed. At the closing portion 17, a small hole 17a is formed, so that a fluid for blowing is supplied through the small hole 17a during the blow molding. The small hole 17a communicates with the interior of the empty container 10.

That is, the aforementioned droplets 3 are distributed on the inner surface of the empty container 10. The thus prepared container 10 is supplied to a user. After closing portion 17 is cut off, the container is filled with contents, and then, the cap is fastened at the mouth portion for sealing tightly the container for sale.

The empty container 10 before being filled with the contents is shaped as mentioned above in order to maintain the sterilization state and preventing entry of a foreign matter, because, as described above, it is difficult to sterilize the interior of the container 10. Moreover, by using sterile air for the blow molding, it is possible to prevent the bacteria included in the atmosphere from entering the bottle, and further to conduct heat sterilization by bringing the liquid into contact with the heated preform.

As being understandable from the above description, the thus prepared direct blow-molded container 10 may be kept empty for a considerably long time before it is filled with contents (aqueous liquid). In a conventional container provided with a liquid layer, the film of liquid may fall during the long period of time. Namely, the liquid layer may fall down on the bottom (or on the mouth portion), whereby the excellent slipperiness may be lost or degraded by the time the container is filled with the contents.

In contrast, in the present invention, since the oily liquid exhibiting slipperiness to the viscous liquid is distributed as droplets, fall of the droplets is effectively controlled even after a long period of time elapses from molding to filling, and thus, excellent slipperiness can be exhibited.

Further, in the present invention, the oily liquid is blended in the resin composition that forms the inner surface, and thus, the droplets 3 can be formed on the inner surface of the empty container 10 even if the upper part of the empty container 10 is closed as described above. Such droplets 3 cannot be formed in the empty container 10 by a method of spraying the liquid, for example.

The direct blow-molded container formed according to the present invention is extremely suitable as a container for containing the aforementioned viscous aqueous liquid. Even a viscous aqueous liquid can be discharged quickly by tilting or inverting the container, without adhering to and remaining on the inner surface of the container. The contents can be taken out quickly by squeezing the container at the body portion.

EXAMPLES

The present invention will be described below by referring to Examples.

The methods for measuring various characteristics, physical properties and the like conducted in Examples below and the resins and the like used for molding the hollow molded articles (containers) are as follows.

1. Microscopic Observation of Surface of Molded Article and Evaluation of Distribution State of Droplets A specimen of 20 mm×40 mm was cut out from a body portion of a multilayer container as a hollow molded article having a capacity of 500 g produced by a method described later, and the surface state on the inner surface side of the specimen was observed with a digital microscope (VHX-1000, manufactured by KEYENCE CORPORATION Ltd.), and the images were taken.

The distribution state of the droplets was analyzed based on the obtained images, using Image-Pro Plus (Ver.5.0.2.9, manufactured by Media Cybernetics, Inc.) as image analysis software. For the analysis items, the equivalent circle sizes (equivalent circle diameters) of the respective droplets formed on the surface was determined, and the distribution state (size, density) per 1 $cm^2$ was evaluated.

2. Observation of Shape of Oily Liquid on Molded Article Surface by Means of White Interferometer A specimen of 20 mm×20 mm was cut out from the body portion of the multilayer container as a hollow molded article having a capacity of 500 g produced by the method described later, and the shape of the surface of the molded article was measured using a non-contact surface profiler (NewView 7300, manufactured by Zygo Corporation). For the measurement and the image analysis, MetroPro (Ver. 9.1.4 64-bit) was used as an application.

Measurement was conducted for a range of 1.40 mm×1.05 mm so as to observe a three-dimensional image of the liquid.

3. Evaluation of Bottom Puddling Property

A multilayer container as a hollow molded article having a capacity of 500 g produced by the method described later was stored for a predetermined period of time in an erected state under an environment of 22° C., 60% RH. After storage of the predetermined period of time, the bottom of the container was visually observed carefully to evaluate whether there was a puddle (liquid puddle) of the oily liquid. The evaluation criteria are as follows.

○: No liquid puddle was found.
X: A liquid puddle was found.

4. Content Remaining Amount Test

The multilayer container as a hollow molded article having a capacity of 500 g produced by the method described later was filled with a sauce (Otafuku-okonomi sauce (sauce for Okonomiyaki or Japanese pizza), manufactured by OTAFUKU SAUCE Co., Ltd.) at room temperature. After the filling, a cap was attached to the mouth portion of the container, and 400 g of the contents were squeezed out at room temperature, and then, the bottle was inverted and allowed to stand at room temperature for 30 minutes.

Later, while keeping the container in the inverted state, the squeezing operation was repeated every 2 minutes and the weight (total of the weight of the remaining contents and the weight of the container) after 10 minutes was measured. After the measurement, the contents remaining inside the container were flushed away with water, and the weight of the container was measured to calculate the difference in the weights, thereby determining the remaining amount. When the remaining amount is smaller, the slipperiness on the inner surface of the container is better. The amount of 5 g or less is favorable.

<Oily Liquid for Forming Droplets>
Medium Chain Fatty Acid Triglyceride (MCT)
  Surface tension: 29 mN/m (23° C.)
  Viscosity: 33.8 mPa·s (23° C.)
  Boiling point: 210° C. or higher
  Flash point: 242° C. (reference value)

The surface tension was measured at 23° C. using a solid-liquid interface analysis system DropMaster 700 (manufactured by Kyowa Interface Science Co., Ltd.). The value of density of the liquid required for the surface tension measurement was measured at 23° C. using a density/specific gravity meter DA-130 (manufactured by Kyoto Electronics Manufacturing Co., Ltd.).

Further, the value of viscosity was measured at 23° C. using a tuning-fork vibration viscometer SV-10 (manufactured by A&D Company Limited).

<Resin for Innermost Layer and Bleedable Additive>
Low-Density Polyethylene (LDPE)
  Density: 0.922 g/cm$^3$
  Critical surface tension: 31 mN/m
Polypropylene (PP)
  Density: 0.900 g/cm$^3$
  Critical surface tension: 29 mN/m
Cyclic Olefin Copolymer
  Critical surface tension: 31 mN/m or more
Calcium Stearate (Manufactured by Wako Pure Chemical Industries, Ltd.)
  Critical surface tension: 28 mN/m
<Resin for Forming Liquid-Diffusion Preventing Layer>
Ethylene-Vinyl Alcohol Copolymer (EVOH)
  Density: 1.20 g/cm$^3$
  Tg: 60° C.
<Resin for Forming Adhesive Layer>
Maleic Anhydride-Modified Polyethylene
<Substrate>
Polypropylene (PP)
  Density: 0.900 g/cm$^3$
<Resin for Forming Outer Layer>
Polypropylene (PP)
  Density: 0.900 g/cm$^3$
Linear Low-Density Polyethylene (LLDPE)
  Density: 0.905 g/cm$^3$ Example 1

A resin composition comprising low-density polyethylene (LDPE), polypropylene (PP) and medium chain fatty acid triglyceride (MCT) was prepared as the resin for forming the innermost layer. The mass ratio of the components in this resin composition was LDPE/PP/MCT=100/10.3/4.6.

Maleic anhydride-modified polyethylene was prepared as the resin for forming the adhesive layer, and the ethylene-vinyl alcohol copolymer was prepared as the resin for forming the liquid-diffusion preventing layer.

Further, polypropylene (PP) was prepared as the resin for forming the substrate layer, and a resin composition comprising polypropylene (PP) and linear low-density polyethylene (LLDPE) (PP/LLDPE=100/17.6 at mass ratio) was prepared as the resin for forming the outer layer.

A multilayer container as a hollow molded article having a capacity of 500 g and a weight of 24 g was produced by: feeding, into a 40-mm extruder, the resin for forming the innermost layer, into a 30-mm extruder A, the resin for forming the adhesive layer, into a 30-mm extruder B, the ethylene-vinyl alcohol copolymer as the resin for forming the liquid-diffusion preventing layer, into a 30-mm extruder C, the resin for forming the adhesive layer, into a 50-mm extruder, the resin for forming the substrate layer, and into a 30-mm extruder C, the resin for forming the outer layer; extruding a molten parison from a multilayer die head heated at a temperature of 210° C.; and conducting a direct blow-molding at a metal mold temperature of 24° C.

The constitution of the resin layer at the position distanced by 60 mm from the bottom of the multilayer container is as follows.

Inner layer (130)/adhesive layer (30)/liquid-diffusion preventing layer (40)/adhesive layer (20)/substrate layer (320)/outer layer (60)

Here, the value in parentheses indicates the thickness of each of the layers (unit: μm, hereinafter the same).

The thus produced container was used to conduct a microscopic observation of the surface of the molded article, an evaluation of distribution state of the droplets, an evaluation of the bottom puddling property, and a content remaining amount test. The results are summarized in Table 1.

Example 2

A resin composition comprising low-density polyethylene (LDPE), polypropylene (PP) and medium chain fatty acid triglyceride (MCT) was prepared as the resin for forming the innermost layer. The mass ratio of the components in this resin composition was LDPE/PP/MCT=100/14.5/6.0.

A multilayer container as a hollow molded article was produced in the same manner as in Example 1 except that the aforementioned resin was used for forming the innermost layer.

The constitution of the resin layer of this container is as follows.

Inner layer (130)/adhesive layer (30)/liquid-diffusion preventing layer (40)/adhesive layer (20)/substrate layer (320)/outer layer (60)

Figure 4A:
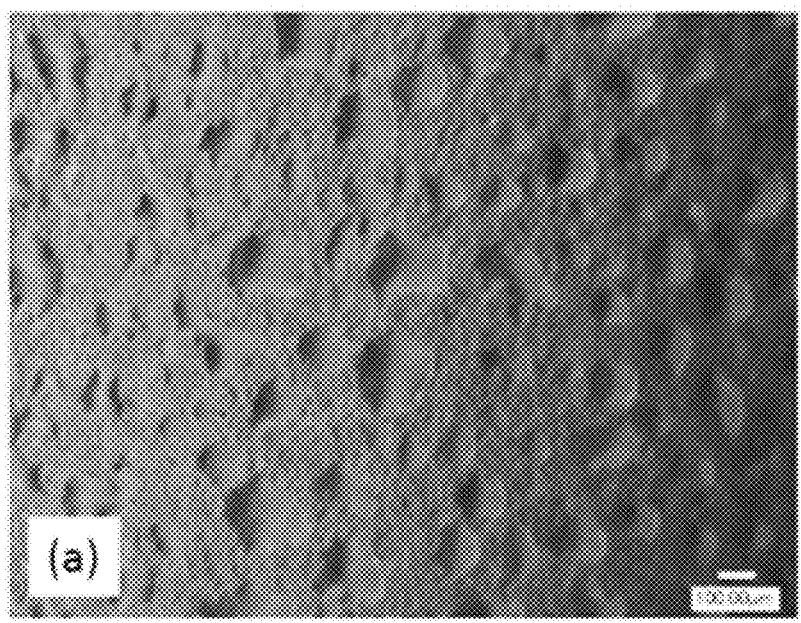
FIG. 4A is a microscopic image (a) of the inner surface of the hollow molded article of the present invention and FIG. 4B is a microscopic image (b) of an inner surface of a hollow molded article of Comparative Example.

The thus produced container was used to conduct a microscopic observation of the surface of the molded article, an evaluation of the distribution state of the droplets, an evaluation of the bottom puddling property, and a content remaining amount test. The results are summarized in Table 1. An image of the surface of the molded article in the microscopic observation is shown in FIG. 4A.

Example 3

A resin composition comprising low-density polyethylene (LDPE), polypropylene (PP) and medium chain fatty acid triglyceride (MCT) was prepared as the resin for forming the innermost layer. The mass ratio of the components in this resin composition was LDPE/PP/MCT=100/17.5/7.5.

A multilayer container as a hollow molded article was produced in the same manner as in Example 1 except that the aforementioned resin was used for forming the innermost layer.

The constitution of the resin layer of this container is as follows.

Inner layer (130)/adhesive layer (30)/liquid-diffusion preventing layer (40)/adhesive layer (20)/substrate layer (320)/outer layer (60)

Figure 5A:
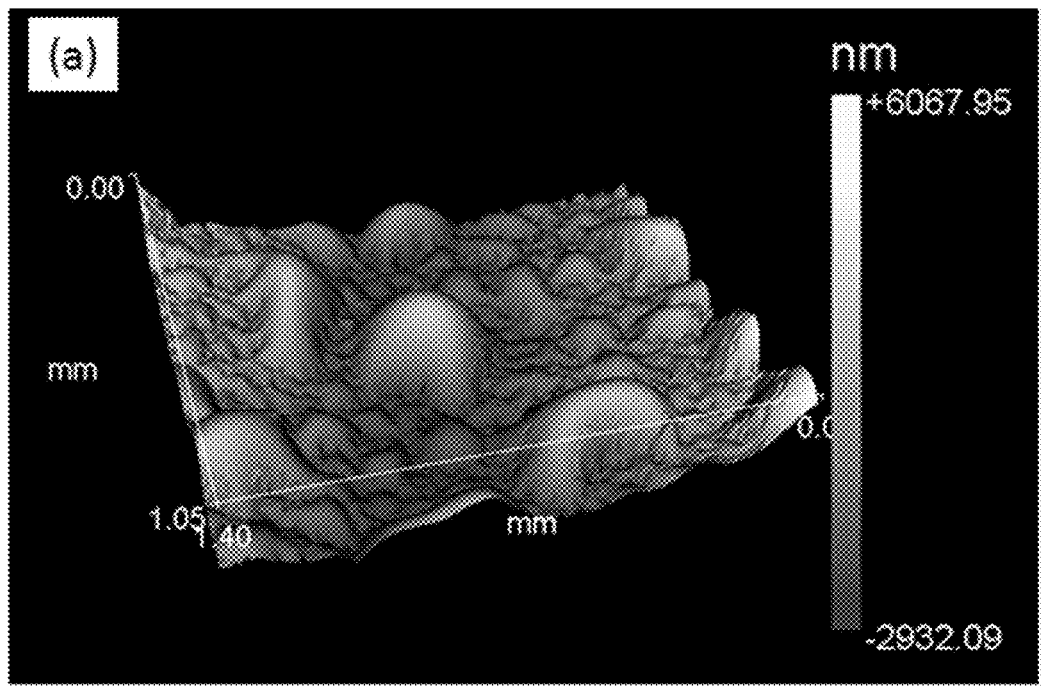
FIG. 5A is an image (a) showing the shape of the oily liquid on the inner surface of the hollow molded article of the present invention.

The thus produced container was used to conduct a microscopic observation of the surface of the molded article, an evaluation of the distribution state of the droplets, an observation of the shape of the oily liquid on the surface of the molded article by means of a white interferometer, an evaluation of the bottom puddling property, and a content remaining amount test. The results are summarized in Table 1. The results of observation of the shape of the oily liquid on the surface of the molded article by means of the white interferometer are shown in FIG. 5A.

Example 4

A resin composition comprising low-density polyethylene (LDPE), calcium stearate (StCa) and medium chain fatty acid triglyceride (MCT) was prepared as the resin for forming the innermost layer. The mass ratio of the components in this resin composition was LDPE/StCa/MCT=100/0.03/4.1.

A multilayer container as a hollow molded article was produced in the same manner as in Example 1 except that the aforementioned resin was used for forming the innermost layer.

The thus produced multilayer container was used to conduct an evaluation of bottom puddling property. The results are shown in Table 1.

Example 5

A resin composition comprising low-density polyethylene (LDPE), calcium stearate (StCa) and medium chain fatty acid triglyceride (MCT) was prepared as the resin for forming the innermost layer. The mass ratio of the components in this resin composition was LDPE/StCa/MCT=100/0.18/4.1.

A multilayer container as a hollow molded article was produced in the same manner as in Example 1 except that the aforementioned resin was used for forming the innermost layer.

The thus produced multilayer container was used to conduct an evaluation of bottom puddling property. The results are shown in Table 1.

Example 6

A resin composition comprising low-density polyethylene (LDPE), calcium stearate (StCa), and medium chain fatty acid triglyceride (MCT) was prepared as the resin for forming the innermost layer. The mass ratio of the components in this resin composition was LDPE/StCa/MCT=100/0.20/4.1.

A multilayer container as a hollow molded article was produced in the same manner as in Example 1 except that the aforementioned resin was used for forming the innermost layer.

The thus produced multilayer container was used to conduct an evaluation of bottom puddling property. The results are shown in Table 1.

Comparative Example 1

A resin composition comprising low-density polyethylene (LDPE) and medium chain fatty acid triglyceride (MCT) was prepared as the resin for forming the innermost layer. The mass ratio of the components in this resin composition was LDPE/MCT=100/5.3.

A multilayer container as a hollow molded article was produced in the same manner as in Example 1 except that the aforementioned resin was used for forming the innermost layer.

The constitution of the resin layer of this container is as follows.

Inner layer (130)/adhesive layer (30)/liquid-diffusion preventing layer (40)/adhesive layer (20)/substrate layer (320)/outer layer (60)

The thus produced container was used to conduct a microscopic observation of the surface of the molded article, an evaluation of the distribution state of the droplets, an evaluation of the bottom puddling property, and a content remaining amount test. The results are summarized in Table 1. In the microscopic observation, no droplet was observed on the surface of the molded article.

Comparative Example 2

A resin composition comprising low-density polyethylene (LDPE), a cyclic olefin copolymer (COC) and medium chain fatty acid triglyceride (MCT) was prepared as the resin for forming the innermost layer. The mass ratio of the components in this resin composition was LDPE/COC/MCT=100/10.3/4.6.

A multilayer container as a hollow molded article was produced in the same manner as in Example 1 except that the aforementioned resin was used for forming the innermost layer.

The constitution of the resin layer of this container is as follows.

Inner layer (100)/adhesive layer (20)/liquid-diffusion preventing layer (30)/adhesive layer (20)/substrate layer (410)/outer layer (60)

The thus produced container was used to conduct a microscopic observation of the surface of the molded article, an evaluation of the distribution state of the droplets, an evaluation of the bottom puddling property, and a content remaining amount test. The results are summarized in Table 1. In the microscopic observation, no droplet was observed on the surface of the molded article.

COMPARATIVE EXAMPLE 3

A resin composition comprising low-density polyethylene (LDPE), a cyclic olefin copolymer (COC) and medium chain fatty acid triglyceride (MCT) was prepared as the resin for forming the innermost layer. The mass ratio of the component in this resin composition was LDPE/COC/MCT=100/14.5/6.0.

A multilayer container as a hollow molded article was produced in the same manner as in Example 1 except that the aforementioned resin was used for forming the innermost layer.

The constitution of the resin layer of this container is as follows.

Inner layer (100)/adhesive layer (20)/liquid-diffusion preventing layer (30)/adhesive layer (20)/substrate layer (410)/outer layer (60)

Figure 4B:
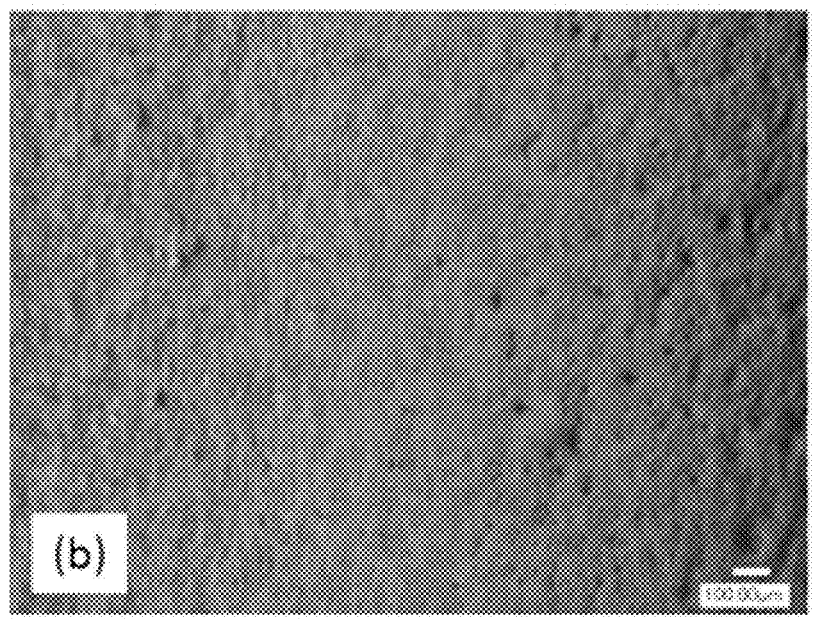
Figure 5B:
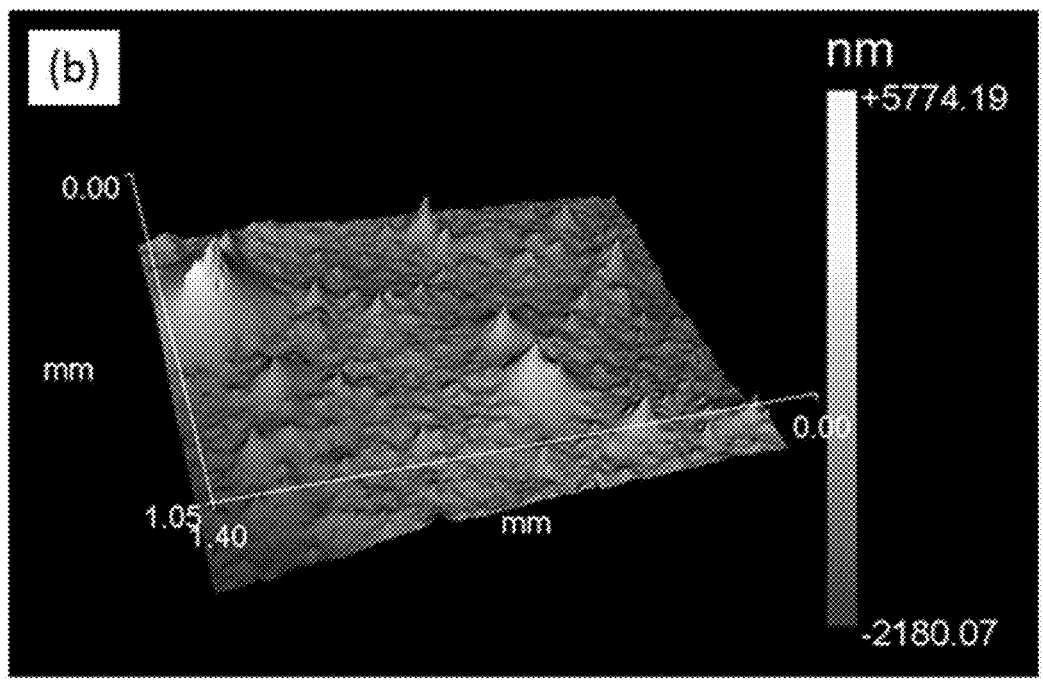
FIG. 5B is an image (b) showing the shape of the oily liquid on the inner surface of the hollow molded article of Comparative Example.

The thus produced container was used to conduct a microscopic observation of the surface of the molded article, an evaluation of the distribution state of the droplets, an observation of the shape of the oily liquid on the surface of the molded article by means of a white interferometer, an evaluation of the bottom puddling property, and a content remaining amount test. The results are summarized in Table 1. A microscopic observation image of the surface of the molded article is shown in FIG. 4B, where no liquid droplet was observed on the surface. The result of observation of the shape of the oily liquid on the molded article by means of the white interferometer is shown in FIG. 5B.

Comparative Example 4

A resin composition comprising low-density polyethylene (LDPE) and polypropylene (PP) was prepared as the resin for forming the innermost layer. The mass ratio of the components in this resin composition was LDPE/PP=100/11.1.

A multilayer container as a hollow molded article was produced in the same manner as in Example 1 except that the aforementioned resin was used for forming the innermost layer.

In this multilayer container, an oily liquid was not used for the inner layer material, and thus, no liquid was present on the inner surface.

The constitution of the resin layer of this container is as follows.

Inner layer (100)/adhesive layer (20)/liquid-diffusion preventing layer (20)/adhesive layer (20)/substrate layer (370)/outer layer (80)

The thus produced container was used to conduct a content remaining amount test. The results are summarized in Table 1.

TABLE 1

| | Inner surface material component (mass part) | | | | |
|---|---|---|---|---|---|
| | LDPE | PP | StCa | COC | MCT |
| Ex. 1 | 100 | 10.3 | | | 4.6 |
| Ex. 2 | 100 | 14.5 | | | 6.0 |
| Ex. 3 | 100 | 17.5 | | | 7.5 |
| Ex. 4 | 100 | | 0.03 | | 4.1 |
| Ex. 5 | 100 | | 0.18 | | 4.1 |
| Ex. 6 | 100 | | 0.20 | | 4.1 |
| Comp. Ex. 1 | 100 | | | | 5.3 |
| Comp. Ex. 2 | 100 | | | 10.3 | 4.6 |
| Comp. Ex. 3 | 100 | | | 14.5 | 6.0 |
| Comp. Ex. 4 | 100 | 11.1 | | | |

| | Distribution state of oily liquid | Droplet density (number/cm$^2$) | | | | | | Evaluation of bottom puddling property | | | | | | Remaining amount test |
|---|---|---|---|---|---|---|---|---|---|---|---|---|---|---|
| | | *1 | *2 | *3 | *4 | *5 | Total | 10 days | 15 days | 20 days | 29 days | 38 days | 49 days | g |
| Ex. 1 | Droplet | 74 | 86 | 34 | 11 | 6 | 211 | — | ○ | — | ○ | — | ○ | 3.3 |
| Ex. 2 | Droplet | 69 | 180 | 86 | 40 | 3 | 378 | — | ○ | — | ○ | — | ○ | 1.4 |
| Ex. 3 | Droplet | 69 | 245 | 69 | 20 | 11 | 414 | — | ○ | — | ○ | — | ○ | 0.7 |
| Ex. 4 | Droplet | — | — | — | — | — | — | — | — | ○ | — | — | ○ | — |
| Ex. 5 | Droplet | — | — | — | — | — | — | — | — | ○ | — | — | ○ | — |
| Ex. 6 | Droplet | — | — | — | — | — | — | — | — | ○ | — | — | ○ | — |
| Comp. Ex. 1 | Layer | — | — | — | — | — | — | X | — | X | — | — | — | 1.1 |
| Comp. Ex. 2 | Layer | — | — | — | — | — | — | ○ | — | X | — | X | — | 1.8 |
| Comp. Ex. 3 | Layer | — | — | — | — | — | — | X | — | X | — | X | — | 2.5 |
| Comp. Ex. 4 | None | — | — | — | — | — | — | — | — | — | — | — | — | 12.8 |

*1 Equivalent circle size: not less than 25 mm and less than 50 mm
*2 Equivalent circle size: not less than 50 mm and less than 100 mm
*3 Equivalent circle size: not less than 100 mm and less than 150 mm
*4 Equivalent circle size: not less than 150 mm and less than 200 mm
*5 Equivalent circle size: not less than 200 mm and less than 300 mm It is shown in Table 1 that the shape of the oily liquid on the inner surface of the hollow molded article (multilayer container) was drop-like (droplet) in Examples 1 to 3 where the inner surface materials included LDPE as the matrix resin, PP as the dispersed resin, and MCT as the oily liquid, and in Examples 4 to 6 where the inner surface materials included LDPE as the matrix resin, StCa as the bleedable organic additive, and MCT as the oily liquid.

On the other hand, the shape of the oily liquid on the inner surface of the hollow molded article was layer-like (liquid layer) in Comparative Example 1 where the inner surface material included LDPE as the matrix resin and MCT as the oil liquid and in Comparative Examples 2 and 3 where the inner surface materials included LDPE as the matrix resin, COC as the dispersed resin, and MCT as the oily liquid.

Therefore, it is understandable that Comparative Examples are differentiated from the present invention in the form of the oily liquid.

When a cyclic olefin copolymer (COC) having a surface tension greater than that of the matrix resin (LDPE) was used as the dispersed resin, no droplet was formed.

On the other hand, when the dispersed resin was polypropylene (PP) having a surface tension lower than that of the matrix resin (LDPE) and the bleedable organic additive was calcium stearate (StCa), droplets were formed. This indicates that it is necessary, for forming droplets, that a substance having a surface tension lower than that of the matrix resin is dispersed in the matrix resin.

The results of the bottom puddling property evaluation in Table 1 show that no bottom puddling was generated even after 49 days in Examples 1 to 6 where the oily liquid was present in the form of droplets, whereas the bottom puddling was generated after 20 days in Comparative Examples 1 to 3 where the oily liquid was present in the form of a liquid layer. Therefore, it is understandable that bottom puddling can be prevented effectively by providing the oily liquid in the form of droplets.

From the results of the content remaining amount tests in Examples 1 to 3 and Comparative Examples 1 to 4, the following conclusion is achieved.

In Comparative Example 4 in which no oily liquid was present on the inner surface, the remaining amount was 12.8 g, whereas in Examples 1 to 3 and Comparative Examples 1 to 3 in which the oily liquid was present on the inner surface, the remaining amount was 5 g or less. That is, the slipperiness of the sauce as the aqueous liquid was dramatically improved, and it is understandable that even in Examples 1 to 3 where the drop-like oily liquid is present, the remaining amount can be reduced.

Further, the results of the evaluation of the distribution state of the droplets in Examples 1 to 3 indicate that the higher the distribution density of the droplets, the more the remaining amount tends to be reduced, thereby suggesting that adjusting the distribution density of the droplets is effective for reducing the remaining amount.

It is evident from the results of the microscopic observation and the observation of the form of the oily liquid by means of the white interferometer, in the present invention shown in FIG. 4A and FIG. 5A, the oily liquid is present in the form of droplets on the inner surface of the molded article, which is evidently different from the oily liquid present in the form of liquid layer as shown in FIG. 4B and FIG. 5B in Comparative Example.

EXPLANATIONS OF LETTERS OR NUMERALS

1: inner surface of hollow molded article
3: droplet
5: dispersed resin
10: empty container
13: mouth portion
15: blow-molded portion
17: closing portion

The invention claimed is:

1. A hollow molded article including a resin layer forming an inner surface, wherein droplets of an oily liquid are distributed on a surface of the resin layer, wherein the inner surface is a hybridized surface comprising a matrix resin and a substance having a lower critical surface tension as compared with the matrix resin, wherein the surface of the resin layer is formed of the matrix resin and a dispersed resin having a lower critical surface tension as compared with the matrix resin, and wherein the matrix resin is an ethylene resin and the dispersed resin is a propylene resin.

2. The hollow molded article according to claim 1, wherein the droplets have an equivalent circle diameter in a range of 25 to 500 μm.

3. The hollow molded article according to claim 1, wherein the droplets are distributed in a density of 100 to 1000 number/cm$^2$.

4. The hollow molded article according to claim 1, wherein the oily liquid is blended in the resin layer.

5. The hollow molded article according to claim 1, wherein the hollow molded article is a direct blow-molded bottle having a closed mouth portion.

6. The hollow molded article according to claim 1, wherein the hollow molded article is a long-length pipe.

7. A method of storing an aqueous liquid in the hollow molded article according to claim 1, which comprises bringing the aqueous liquid into contact with the surface of the resin layer forming the inner surface, in a state where the droplets are distributed on the surface of the resin layer forming the inner surface.

8. A hollow molded article including a resin layer forming an inner surface, wherein droplets of an oily liquid are distributed on a surface of the resin layer, wherein the inner surface is a hybridized surface comprising a matrix resin and a substance having a lower critical surface tension as compared with the matrix resin, wherein the surface of the resin layer is formed of the matrix resin and a bleedable organic additive having a lower critical surface tension as compared with the matrix resin, and wherein the matrix resin is an ethylene resin and the bleedable organic additive is a fatty acid metal salt.

9. The hollow molded article according to claim 8, wherein the droplets have an equivalent circle diameter in a range of 25 to 500 μm.

10. The hollow molded article according to claim 8, wherein the droplets are distributed in a density of 100 to 1000 number/cm$^2$.

11. The hollow molded article according to claim 8, wherein the oily liquid is blended in the resin layer.

12. The hollow molded article according to claim 8, wherein the hollow molded article is a direct blow-molded bottle having a closed mouth portion.

13. The hollow molded article according to claim 8, wherein the hollow molded article is a long-length pipe.

14. A method of storing an aqueous liquid in the hollow molded article according to claim 8, which comprises bringing the aqueous liquid into contact with the surface of the resin layer forming the inner surface, in a state where the droplets are distributed on the surface of the resin layer forming the inner surface.

* * * * *